(12) United States Patent
Ishihara et al.

(10) Patent No.: US 7,432,718 B2
(45) Date of Patent: Oct. 7, 2008

(54) ELECTRONIC DEVICE AND METHOD OF CONTROLLING SAME

(75) Inventors: Atsushi Ishihara, Tokyo (JP); Tomohiro Yamada, Kanagawa (JP); Yoshihiro Chosokabe, Nagano (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/595,799

(22) Filed: Nov. 9, 2006

(65) Prior Publication Data

US 2007/0164748 A1  Jul. 19, 2007

(30) Foreign Application Priority Data

Nov. 10, 2005  (JP)  ............................... 2005-326527

(51) Int. Cl.
*G01R 29/12* (2006.01)
*G01S 13/08* (2006.01)
*G06F 19/00* (2006.01)

(52) U.S. Cl. .......................... 324/457; 342/47; 700/245

(58) Field of Classification Search ................. 324/457, 324/635, 644, 662, 699, 716, 71.1, 76.11, 324/158.1; 700/245; 901/1, 8; 318/568.11, 318/568.12, 568.2
See application file for complete search history.

(56) References Cited

U.S. PATENT DOCUMENTS

| 2004/0199292 | A1  | 10/2004 | Sakagami et al. |
| 2005/0219114 | A1* | 10/2005 | Kawabe et al. ................. 342/47 |
| 2006/0058921 | A1* | 3/2006  | Okamoto ..................... 700/255 |
| 2006/0181236 | A1* | 8/2006  | Brogardh ................. 318/568.1 |
| 2006/0253224 | A1* | 11/2006 | Tani et al. .................... 700/245 |
| 2007/0013510 | A1* | 1/2007  | Yamada et al. ........... 340/539.1 |
| 2007/0040545 | A1* | 2/2007  | Takiguchi ................. 324/76.11 |
| 2007/0118248 | A1* | 5/2007  | Lee et al. ..................... 700/245 |

FOREIGN PATENT DOCUMENTS

| JP | 2004-130428 A | 4/2004 |
| JP | 2004-361276 A | 12/2004 |

* cited by examiner

*Primary Examiner*—Diego Gutierrez
*Assistant Examiner*—Hoai-An D Nguyen
(74) *Attorney, Agent, or Firm*—Lerner, David, Littenberg, Krumholz & Mentlik, LLP

(57) ABSTRACT

An electronic device includes a main body, a drive mechanism configured to move the main body, a detector having a plurality of sensors mounted in the main body for detecting distances to an object which is present in a space around the main body, a calculator configured to calculate a direction of the object relative to the main body based on the detected distances, and a controller configured to control the drive mechanism to change an orientation of the main body dependent on the calculated direction.

7 Claims, 17 Drawing Sheets

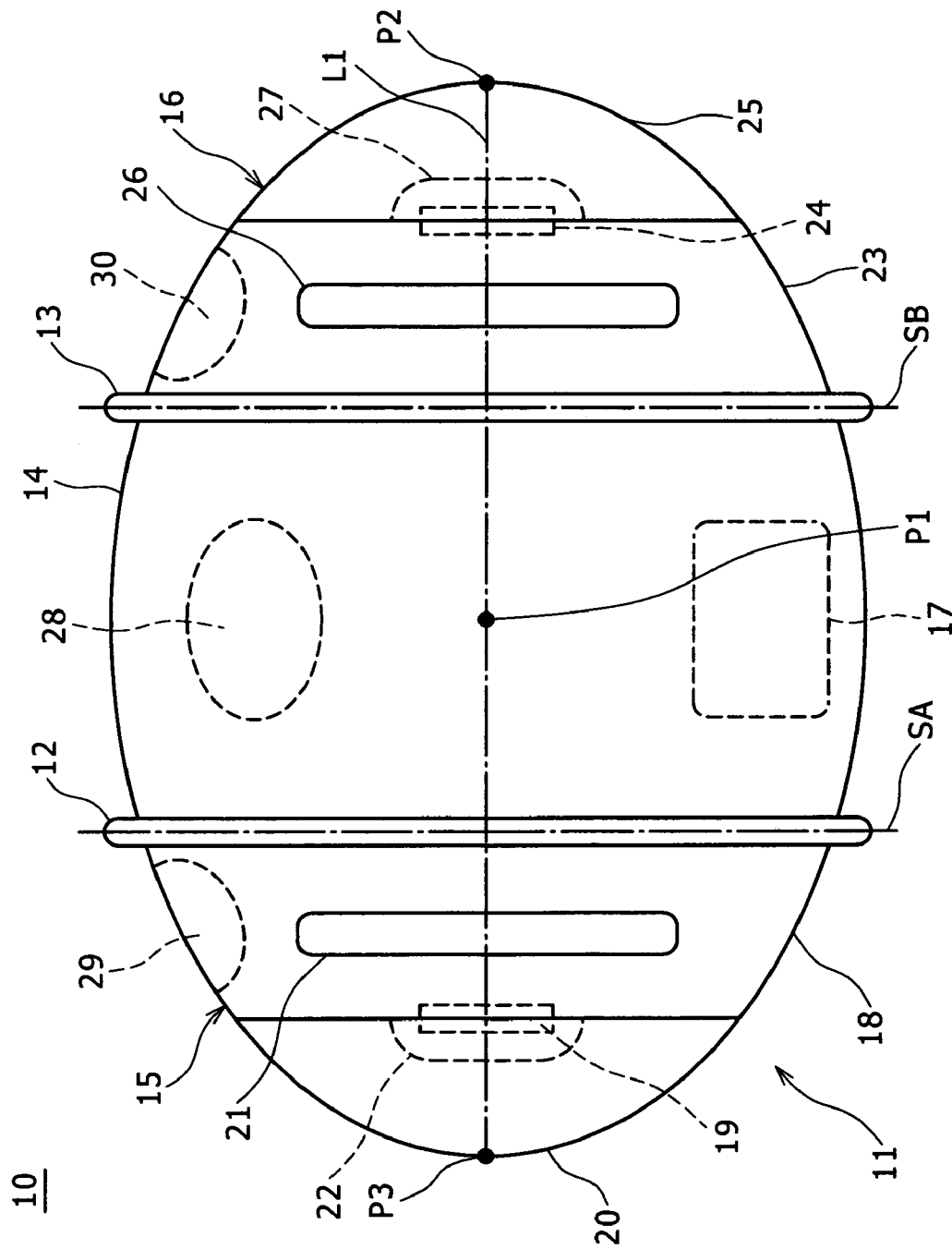

ELECTRONIC DEVICE AND METHOD OF CONTROLLING SAME

CROSS-REFERENCE TO RELATED APPLICATIONS

The present application claims priority from Japanese Patent Application No. JP 2005-326527 filed on Nov. 10, 2005, the disclosure of which is hereby incorporated by reference herein.

BACKGROUND OF THE INVENTION

1. Field of the Invention

The present invention relates to an electronic device and a method of controlling an electronic device, and more particularly to an electronic device which is used in a predetermined direction and a method of controlling such an electronic device.

2. Description of the Related Art

Many electronic devices such as audio devices and input devices that have been in widespread use in recent years are premised on use in a predetermined direction. Specifically, an audio device is premised on such use that its speakers have sound radiating surfaces directed toward the user, and an input device is premised on such use that its operating face with operating buttons is directed toward the user.

Stated otherwise, if an electronic device in the past is used in a direction which is not the predetermined direction in which it is supposed to be used, then the user finds it awkward to use the electronic device because, for example, the user cannot hear good stereophonic sounds from the electronic device or is unable to operate the electronic device smoothly. When the electronic device in the past is oriented in the undesirable direction, the user needs to move relatively to the electronic device or to turn the electronic device so that the electronic device will be oriented in the predetermined direction with respect to the user.

If the electronic device can detect the direction in which the user is present and orient itself into the predetermined direction with respect to the user, then the user will find it much easier to use the electronic device.

One electronic device in the past has a sensor for detecting the distance up to the user who is present in a predetermined direction. However, the electronic device in the past is unable to detect the direction in which the user is present as the sensor can detect only the distance up to the user. For details, reference should be made to Japanese patent laid-open No. 2004-130428.

As described above, though some electronic devices in the past are premised on use in a predetermined direction with respect to the user, since they are unable to detect the direction in which the user is present, the user needs to move relatively to the electronic device or to turn the electronic device with respect to the user. Consequently, those electronic devices in the past have been awkward to use.

It is an object of the present invention to provide an electronic device which can be used with more ease than heretofore and a method of controlling such an electronic device.

SUMMARY OF THE INVENTION

To achieve the above object, there is provided in accordance with the present invention an electronic device including a main body, a drive mechanism for moving the main body, a detector having a plurality of sensors mounted in the main body for detecting distances to an object which is present in a space around the main body, a calculator for calculating a direction of the object relative to the main body based on the detected distances, and a controller for controlling the drive mechanism to change an orientation of the main body dependent on the calculated direction.

The direction in which the object, e.g., the user, is present is recognized, and the orientation of the main body is changed into alignment with the recognized direction in which the user is present. The electronic device can thus be used in the direction in which the user is present, i.e., in the direction in which the electronic device is supposed to be used, without the need for the user to move or to change the orientation of the main body.

The electronic device thus arranged is much easier to use than heretofore. According to the present invention, there is also provided a method of controlling the electronic device to allow the electronic robot device to be used much easier than heretofore.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is an elevational view of the music playback robot device;

DETAILED DESCRIPTION

(1) Overview of an Electronic Device

Figure 1:
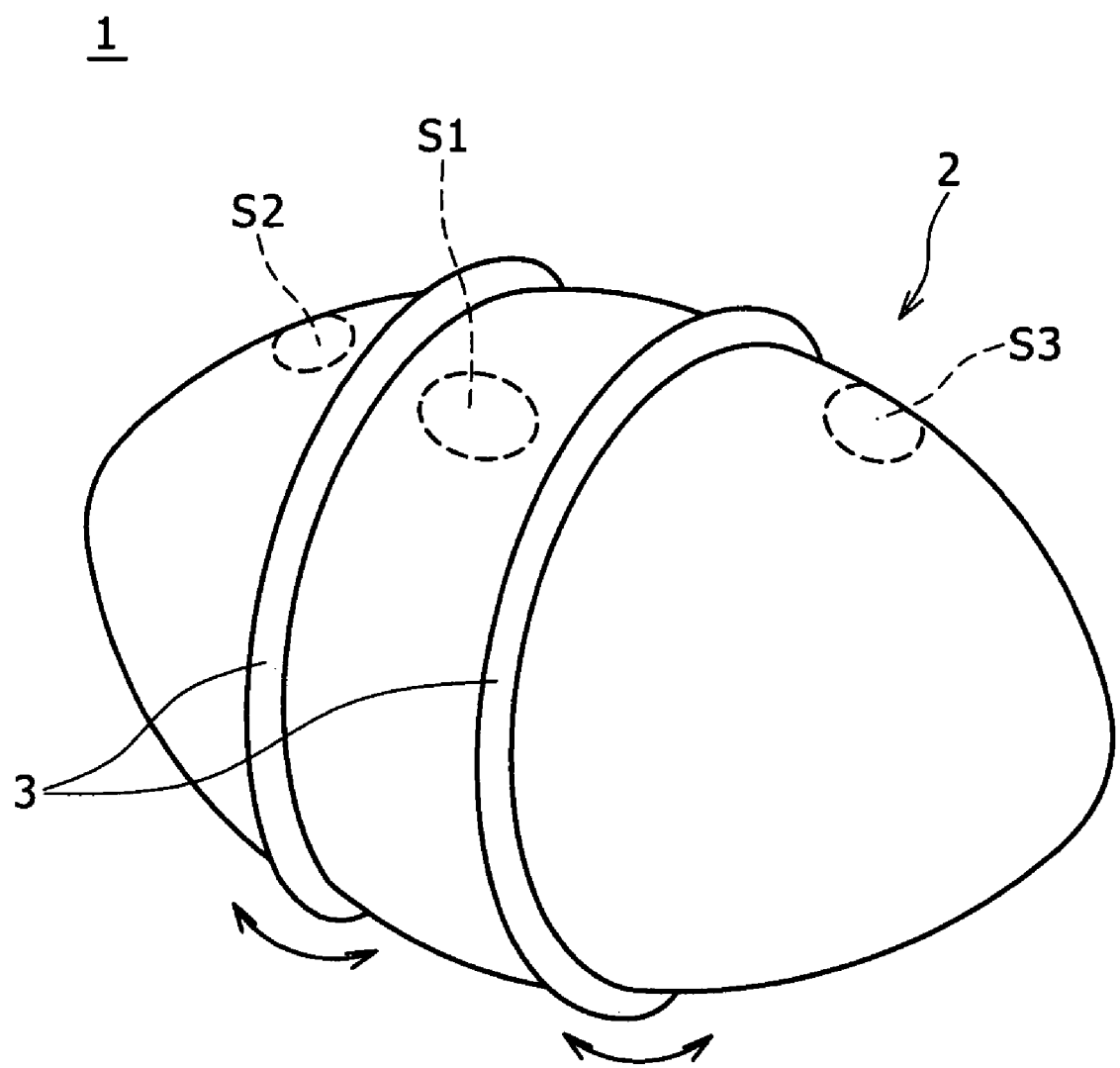
FIG. 1 is a perspective view of an electronic device according to an embodiment of the present invention.
Figure 2:
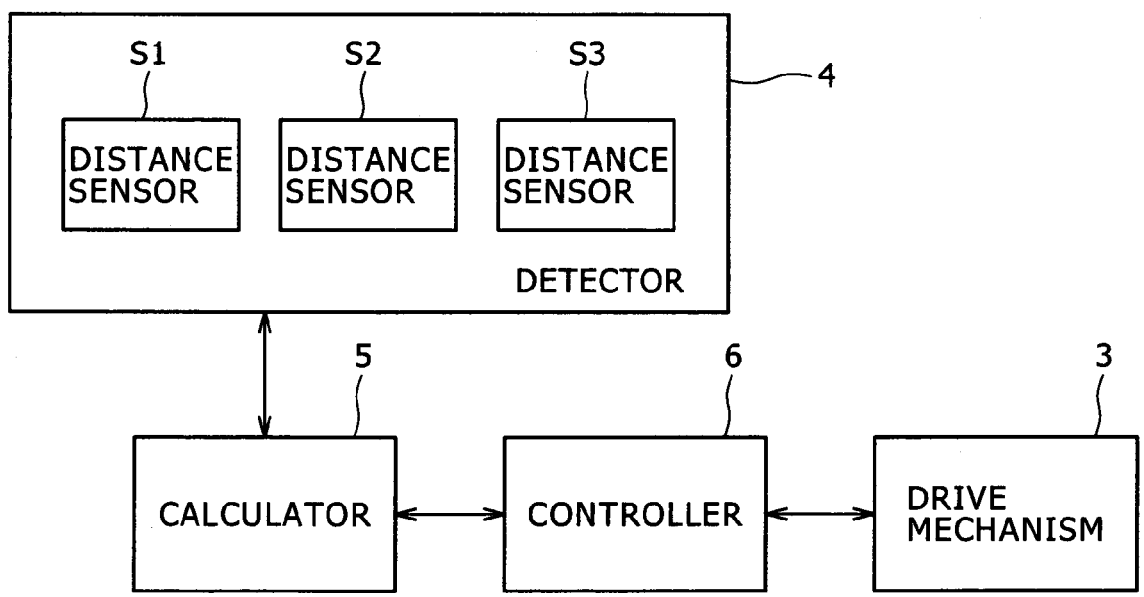
FIG. 2 is a block diagram of a circuit arrangement of the electronic device.

First, an electronic device according to an embodiment of the present invention will briefly be described below with reference to FIGS. 1 and 2. As shown in FIGS. 1 and 2, an electronic device 1 has a main body 2, a drive mechanism 3 for changing the orientation of the main body 2, a detector 4 disposed in the main body 2 and having a plurality of distance sensors S1, S2 and S3 for detecting the distance up to an object (not shown) that is present in a space around the main body 2, a calculator 5 for calculating the direction of the object with respect to the electronic device 1 based on the distance detected by the detector 4, and a controller 6 for controlling the drive mechanism 3 to change the orientation of the main body 2.

In operation, based on the distance detected by the detector 4 which has the distance sensors S1, S2 and S3, the electric device 1 calculates the direction in which the object, e.g., the user, is present, and changes the orientation of the main body 2 into alignment with the calculated direction. Therefore, the electronic device 1 can be used in the orientation depending on the direction in which the user is present, i.e., in the direction in which the electronic device 1 is supposed to be used, without the need for the user to move with respect to the electronic device 1 or to change the orientation of the main body 2 with respect to the user.

Each of the distance sensors S1, S2 and S3 of the detector 4 includes a quasi-electrostatic field sensor. The quasi-electrostatic field sensor will be described in detail below.

(2) Quasi-Electrostatic Field Sensor

(2-1) Properties of a Quasi-Electrostatic Field

First, a quasi-electrostatic field which forms a basis for a quasi-electrostatic field sensor will be described below. An electric field is generated as a combination of a radiative electric field which is in inverse proportion to the distance from an electric field source, an inductive electromagnetic field which is in inverse proportion to the square of the distance from the electric field source, and a quasi-electrostatic field which is in inverse proportion to the cube of the distance from the electric field source.

Figure 3:
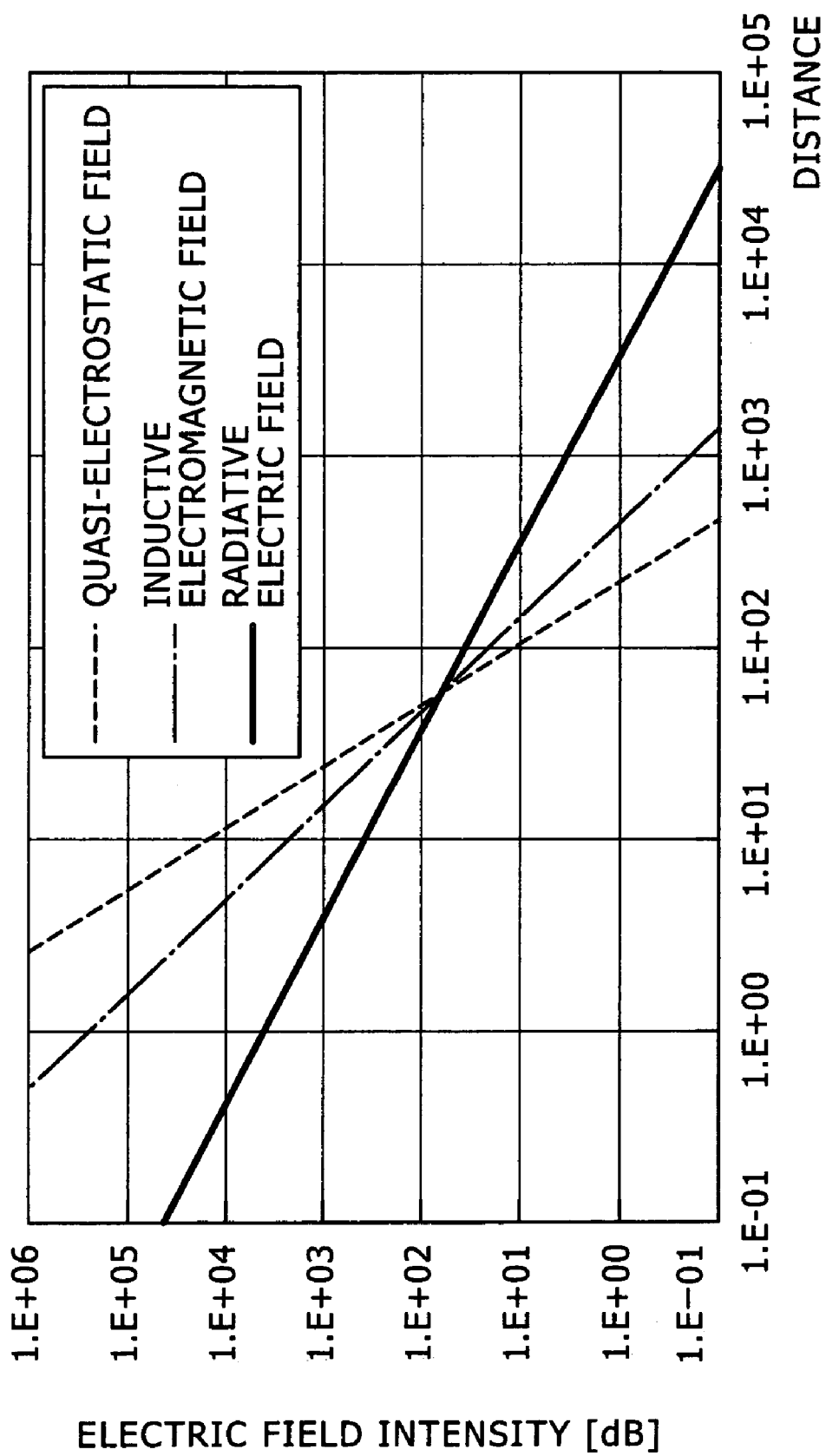
FIG. 3 is a graph showing relative intensity changes of electric fields depending on the distance.

Relative intensities of the radiative electric field, the inductive electromagnetic field, and the quasi-electrostatic field are related to the distance as shown in a graph of FIG. 3. In FIG. 3, the relationship between the relative intensities of the electric fields at 1 [MHz] and the distance is indicated on a logarithmic scale.

As can be seen from FIG. 3, there is a distance wherein the relative intensities of the radiative electric field, the inductive electromagnetic field, and the quasi-electrostatic field are equal to each other. Such a distance will hereinafter be referred to as "intensity boundary point". At distances farther than the intensity boundary point, the radiative electric field is dominant, i.e., it is greater than the inductive electromagnetic field and the quasi-electrostatic field. At distances closer than the intensity boundary point, the quasi-electrostatic field is dominant, i.e., it is greater than the radiative electric field is dominant and the inductive electromagnetic field.

Each of the intensity $E_{\theta, radiation}$ of the radiative electric field, the intensity $E_{\theta, induction}$ of the inductive electromagnetic field, and the intensity $E_{\theta, quasi\text{-}electrostatic}$ of the quasi-electrostatic field at a position that is spaced a distance r [m] from a dipole (electric field source) is expressed by the following equation:

$$r = \frac{1}{k} \quad (1)$$

In the equation (1), the electric charge on the dipole is represented by q [c], the length of the dipole by l [m], the wave number by k [1/m], and the imaginary unit by j.

Since the intensities of the radiative electric field, the inductive electromagnetic field, and the quasi-electrostatic field are equal to each other at the intensity boundary point, the distance r satisfies the following equation:

$$k = \frac{2\pi f}{c} \quad (2)$$

The distance r from the electric field source to the intensity boundary point is expressed by:

$$r = \frac{c}{2\pi f} \quad (3)$$

If the velocity of light in vacuum is indicated by c [m/s] ($c=3\times10^8$) and the frequency by f [Hz], then the wave number k [1/m] in the equation (3) is expressed by:

$$E_{(r)} = \frac{A_{(r)}}{r^3} \quad (4)$$

Therefore, the intensity boundary point is expressed by the following equation, which is produced by substituting the equation (3) in the equation (4):

$$E_{(r)} = A_{(r)} \cdot \frac{1}{\left[\frac{c}{2\pi f_{(r)}}\right]^3} \quad (5)$$

As can be seen from the equation (5), the frequency is closely related if the space of the quasi-electrostatic field whose intensity is greater than the radiative electric field and the inductive electromagnetic field is greater. As the frequency is lower, the space of the quasi-electrostatic field whose intensity is greater than the radiative electric field and the inductive electromagnetic field is greater. Specifically, the distance up to the intensity boundary point shown in FIG. 3 is greater as the frequency is lower, i.e., is shifted to the right as the frequency is lower. Conversely, as the frequency is higher, the space of the quasi-electrostatic field whose intensity is greater than the radiative electric field and the inductive electromagnetic field is smaller. Specifically, the distance up to the intensity boundary point shown in FIG. 3 is smaller as the frequency is higher, i.e., is shifted to the left as the frequency is higher.

Figure 4:
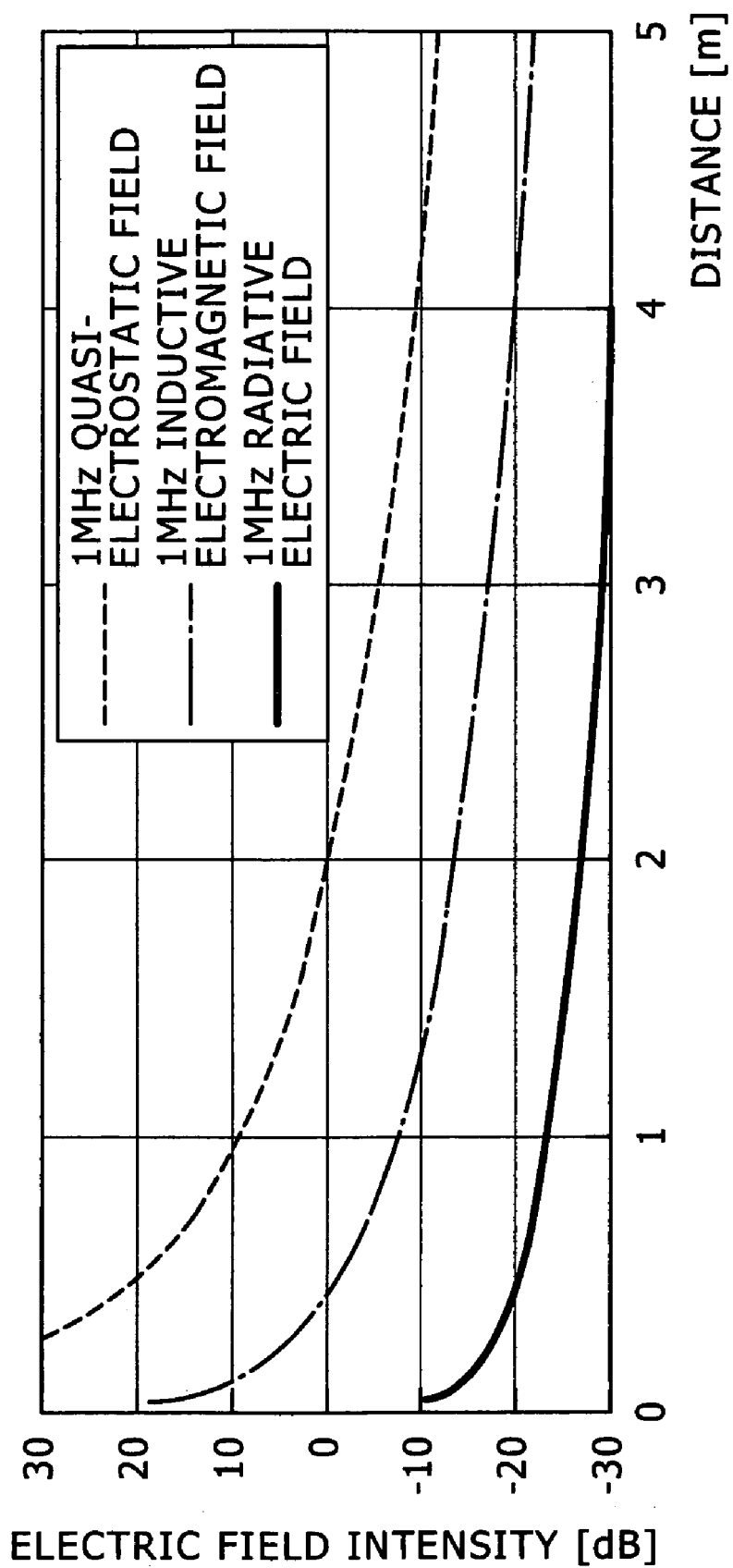
FIG. 4 is a graph showing relative intensity changes of electric fields depending on the distance.

If the frequency of 1 [MHz], for example, is selected, then according to the above equation (5), as can be understood from FIG. 4 which shows the distance in an antilogarithmic scale, the intensity of the quasi-electrostatic field in a space up to a position that is 2 [m] spaced from the electric field source is about 13 [dB] greater than the inductive electromagnetic field. In this space, therefore, the quasi-electrostatic field can be detected without being essentially subject to the inductive electromagnetic field and the radiative electric field.

(2-2) Measurement of a Distance Using the Quasi-Electrostatic Field

Figure 5:
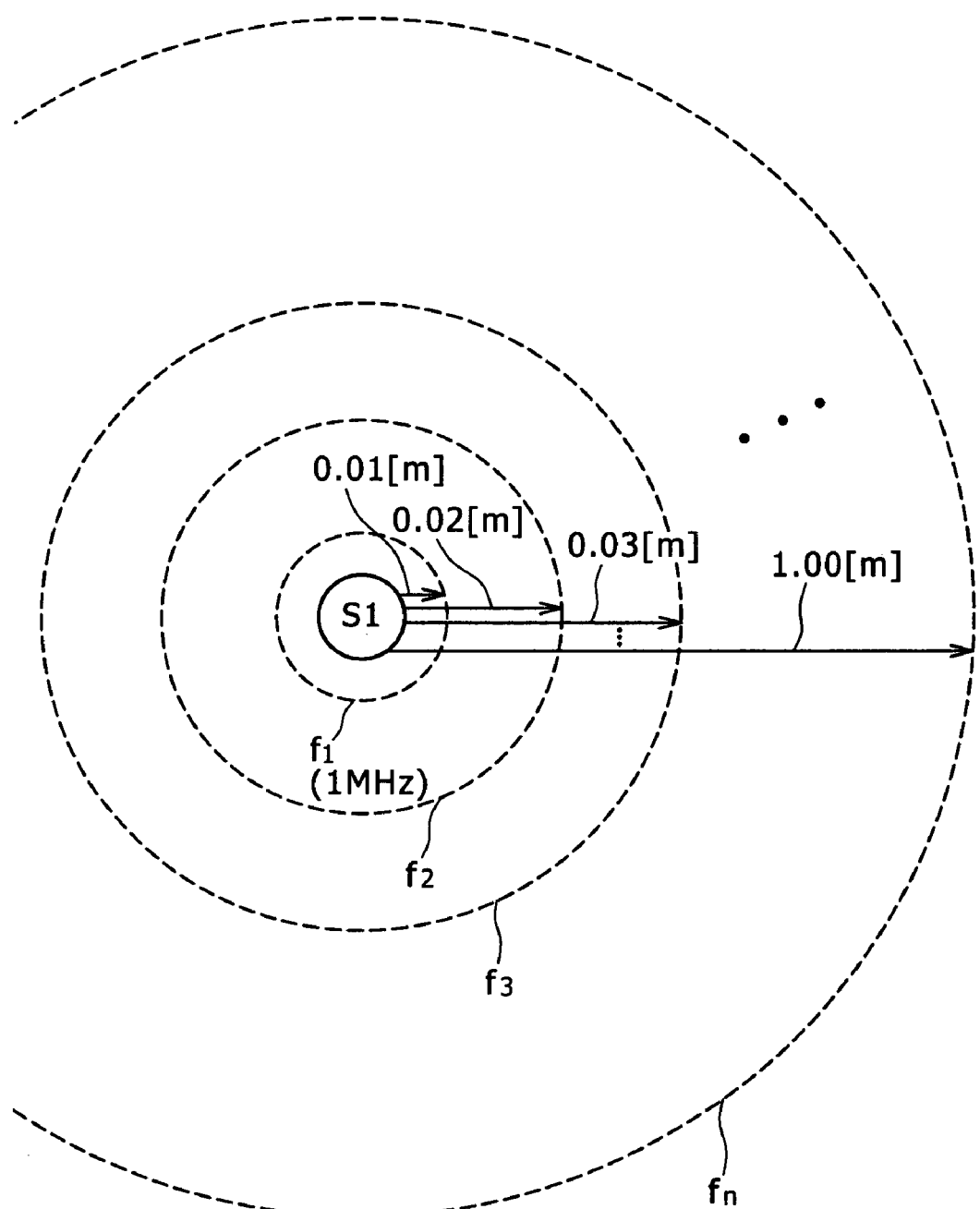
FIG. 5 is a diagram showing the relationship between the distance and the frequency in a quasi-electrostatic field.

Based on the above properties of the quasi-electrostatic field, as shown in FIG. 5, the distance sensor S1 which includes the quasi-electrostatic field sensor generates a plurality of quasi-electrostatic fields corresponding to respective frequencies f1 through fn. The frequency f1 of 1 [MHz] is associated as a reference frequency to a range of 0.01 [m] from the distance sensor S1, i.e., a distance of 0.01 [m] from the distance sensor S1. The frequencies f2 through fn are progressively lower in the order named, and are associated to respective ranges which are progressively greater by 0.01 [m]. The distance sensor S1 detects variations of the quasi-electrostatic fields (potential changes) which are caused when the user enters the quasi-electrostatic fields, and identifies a frequency corresponding to the quasi-electrostatic field whose variation has exceeded a predetermined threshold value. The distance sensor S1 then detects the distance corresponding to the identified frequency as the distance from the distance sensor S1 to the user.

The distance sensor S1 which includes the quasi-electrostatic field sensor is thus arranged to detect the distance up to the user who is present in the space around the distance sensor S1, using the quasi-electrostatic field. For details of the quasi-electrostatic field sensor, reference should be made to Japanese patent application No. 2003-160816 which was filed by the present applicant and has already been published.

(3) Structural Details of a Music Playback Robot Device

Figure 6A:
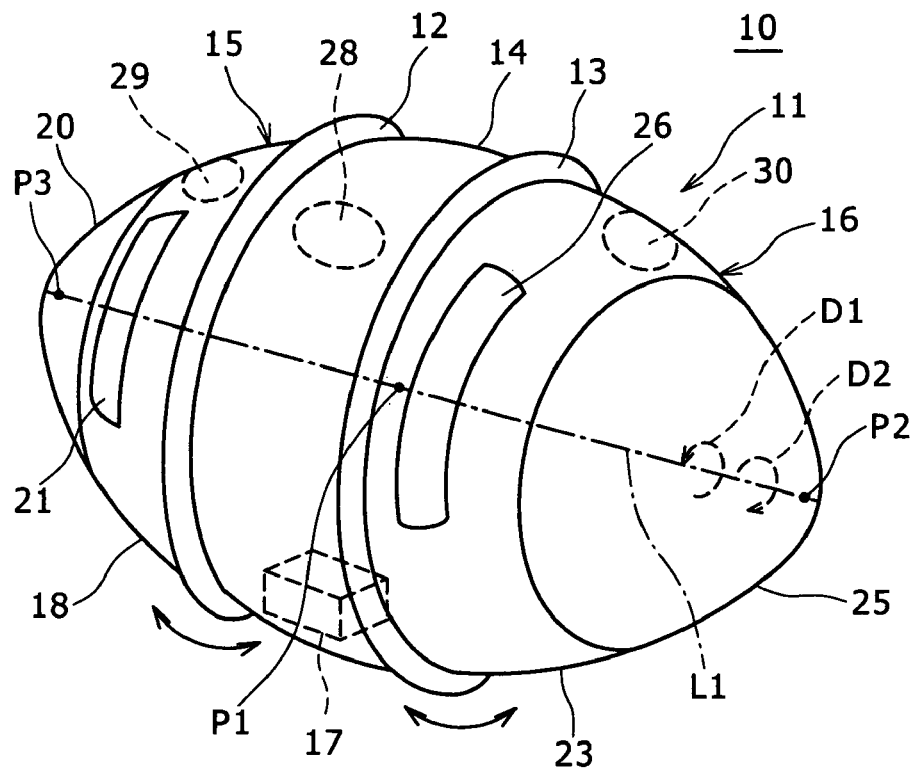
FIG. 6A is a perspective view of a music playback robot device.
Figure 6B:
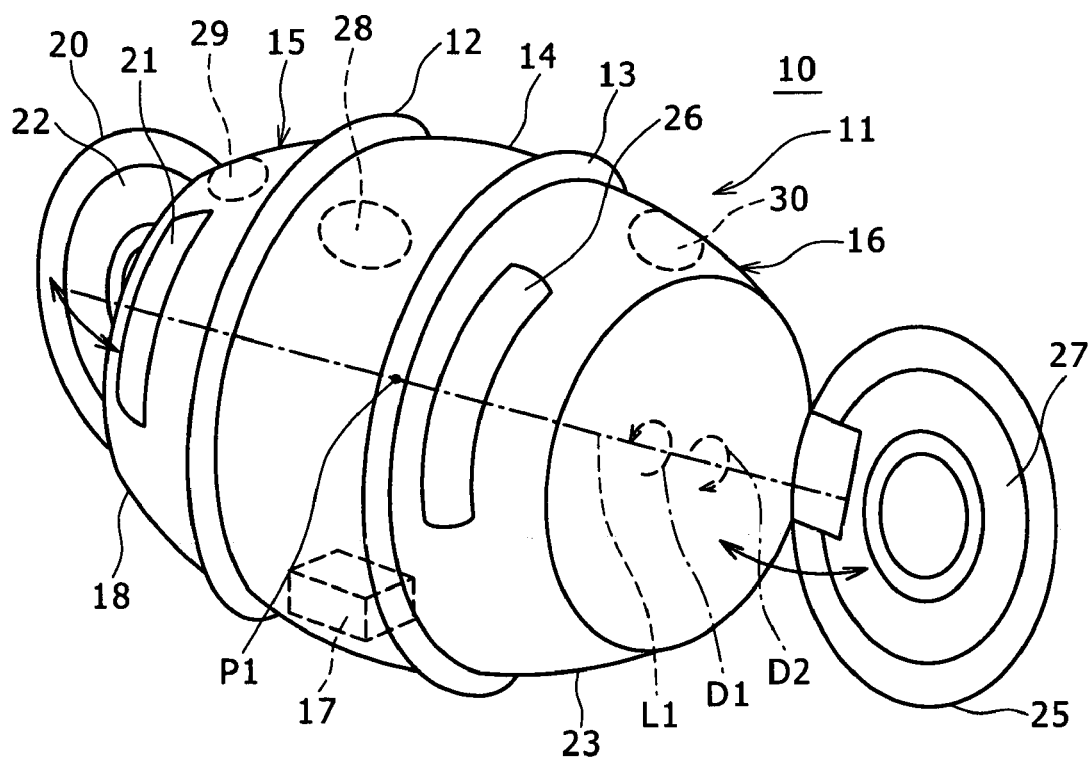
FIG. 6B is another perspective view of the music playback robot device.

A music playback robot device 10 shown in FIGS. 6A, 6B, and 7 as a specific example of the electronic device with the quasi-electrostatic field sensors will be described below.

The music playback robot device 10 has a substantially ellipsoidal casing 11. The music playback robot device 10 also has identically shaped annular left and right wheels 12, 13 mounted on and projecting outwardly from the outer circumferential surface of the ellipsoidal casing 11. The left and right wheels 12, 13 are positioned in respective left and right vertical planes SA, SB spaced equal distances from a central point P1 of the ellipsoidal casing 11 and extending perpendicularly to a horizontal axis L1 of the casing ellipsoidal 11. The horizontal axis L1 extends as a straight line passing through the central point P1 and crest points P2, P3 of the ellipsoidal casing 11 which are spaced the greatest distance from each other on the outer circumferential surface of the ellipsoidal casing 11.

Figure 8:
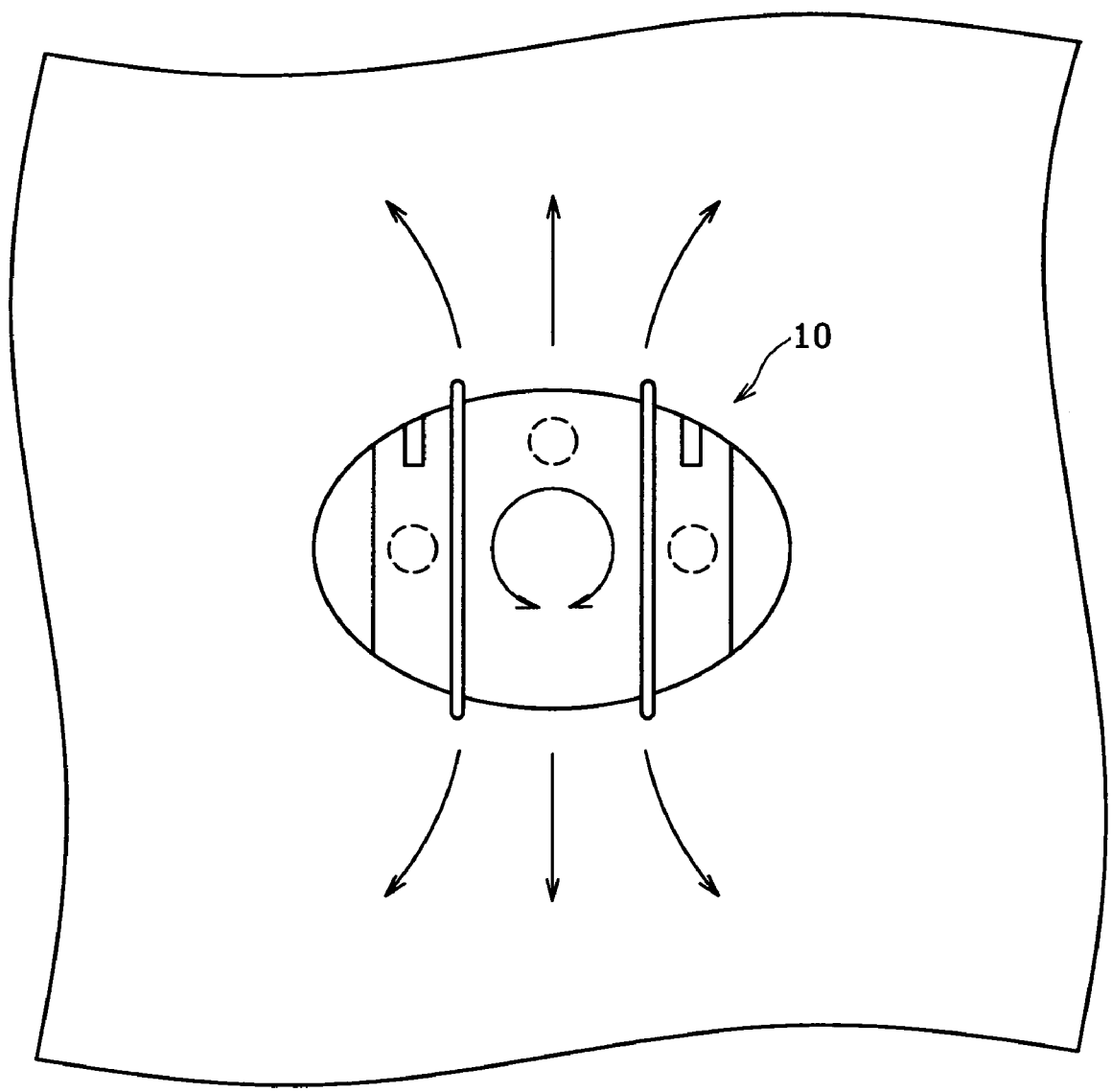
FIG. 8 is a plan view showing the manner in which the music playback robot device moves.

The annular left and right wheels 12, 13 have respective outside diameters which are greater than the maximum outside diameter of the ellipsoidal casing 11 around the horizontal axis L1. The annular left and right wheels 12, 13 are mounted on the ellipsoidal casing 11 for angular movement in a direction D1 around the horizontal axis L1 and an opposite direction D2 around the horizontal axis L1. When the music playback robot device 10 is placed on a horizontal surface, for example, only the left and right wheels 12, 13 are held in contact with the horizontal surface and support the ellipsoidal casing 11 horizontally off the horizontal surface. When the left and right wheels 12, 13 are controlled to turn independently of each other, the ellipsoidal casing 11 is angularly moved clockwise or counterclockwise as shown in FIG. 8 or moved forward, obliquely forward to the left, obliquely forward to the right, backward, obliquely backward to the left, or obliquely backward to the right.

The ellipsoidal casing 11 includes a central casing 14 positioned between the left and right wheels 12, 13, a substantially conical left casing 15 positioned leftward of the central casing 14 and tapered leftward from the central casing 14 toward the horizontal axis L1, and a substantially conical right casing 16 positioned rightward of the central casing 14 and tapered rightward from the central casing 14 toward the horizontal axis L1.

The central casing 14 houses a weight 17 such as a battery or the like at a central lower position therein. The weight 17 places the center of gravity of the central casing 14 vertically below the central point P1. With the center of gravity being thus positioned, even though the music playback robot device 10 is held in contact with the horizontal surface through two points, i.e., the left wheel 12 and the right wheel 13, the central casing 14 is prevented from being continuously rotated about the horizontal axis L1 in the direction D1 and the direction D2 and has its posture held stably when the music playback robot device 10 is moving on the horizontal surface.

The left casing 15 includes a left rotor 18 rotatably mounted on the central casing 14 for angular movement about the horizontal axis L1 in the direction D1 and the direction D2 (see FIGS. 6A, 6B), and a left openable and closable body 20 attached to a left side of the left rotor 18 by a hinge 19 so that the left openable and closable body 20 can be opened outwardly and closed inwardly on the left of the left rotor 18. The left rotor 18 supports on its outer surface a left light emitter 21 such as a light-emitting diode or the like. The left openable and closable body 20 houses a speaker 22 disposed therein. When the left openable and closable body 20 is opened outwardly to the left about the hinge 19, the front surface of the vibrating plate of the speaker 22 is exposed outwardly, as shown in FIG. 6B.

Similarly, the right casing 16 includes a right rotor 23 rotatably mounted on the central casing 14 for angular movement about the horizontal axis L1 in the direction D1 and the direction D2 (see FIGS. 6A, 6B), and a right openable and closable body 25 attached to a right side of the right rotor 23 by a hinge 24 so that the right openable and closable body 25 can be opened outwardly and closed inwardly on the right of the right rotor 23. The right rotor 23 supports on its outer surface a left light emitter 26 such as a light-emitting diode or the like. The right openable and closable body 25 houses a speaker 27 disposed therein. When the right openable and closable body 25 is opened outwardly to the right about the hinge 24, the front surface of the vibrating plate of the speaker 27 is exposed outwardly, as shown in FIG. 6B.

As shown in FIG. 7, the surface of the ellipsoidal casing 11 which is viewed when the left casing 15 is positioned on the left and the right casing 16 on the right serves as a front surface of the ellipsoidal casing 11. When the front surface of the ellipsoidal casing 11 faces the user, the user enters commands into the music playback robot device 10 for playing back music. Therefore, the music playback robot device 10 is premised on such usage that the user enters commands into the music playback robot device 10 while the front surface of the ellipsoidal casing 11 is facing the user.

The music playback robot device 10 has a front distance sensor 28 disposed in the central casing 14 at an upper front position therein, a left distance sensor 29 disposed in the left casing 15 at an upper position therein, and a right distance sensor 30 disposed in the right casing 16 at an upper position therein. Each of the front distance sensor 28, the left distance sensor 29, and the right distance sensor 30 includes a quasi-electrostatic field sensor as described above for detecting the distance up to the user using a quasi-electrostatic field. Based on detected results from the front distance sensor 28, the left distance sensor 29, and the right distance sensor 30 which are located at different positions in the ellipsoidal casing 11, the music playback robot device 10 recognizes the distance up to the user which is present near the ellipsoidal casing 11, and the direction of the user, i.e., the position of the user, as viewed from the front side of the ellipsoidal casing 11.

(4) Music Data Transfer System

Figure 9:
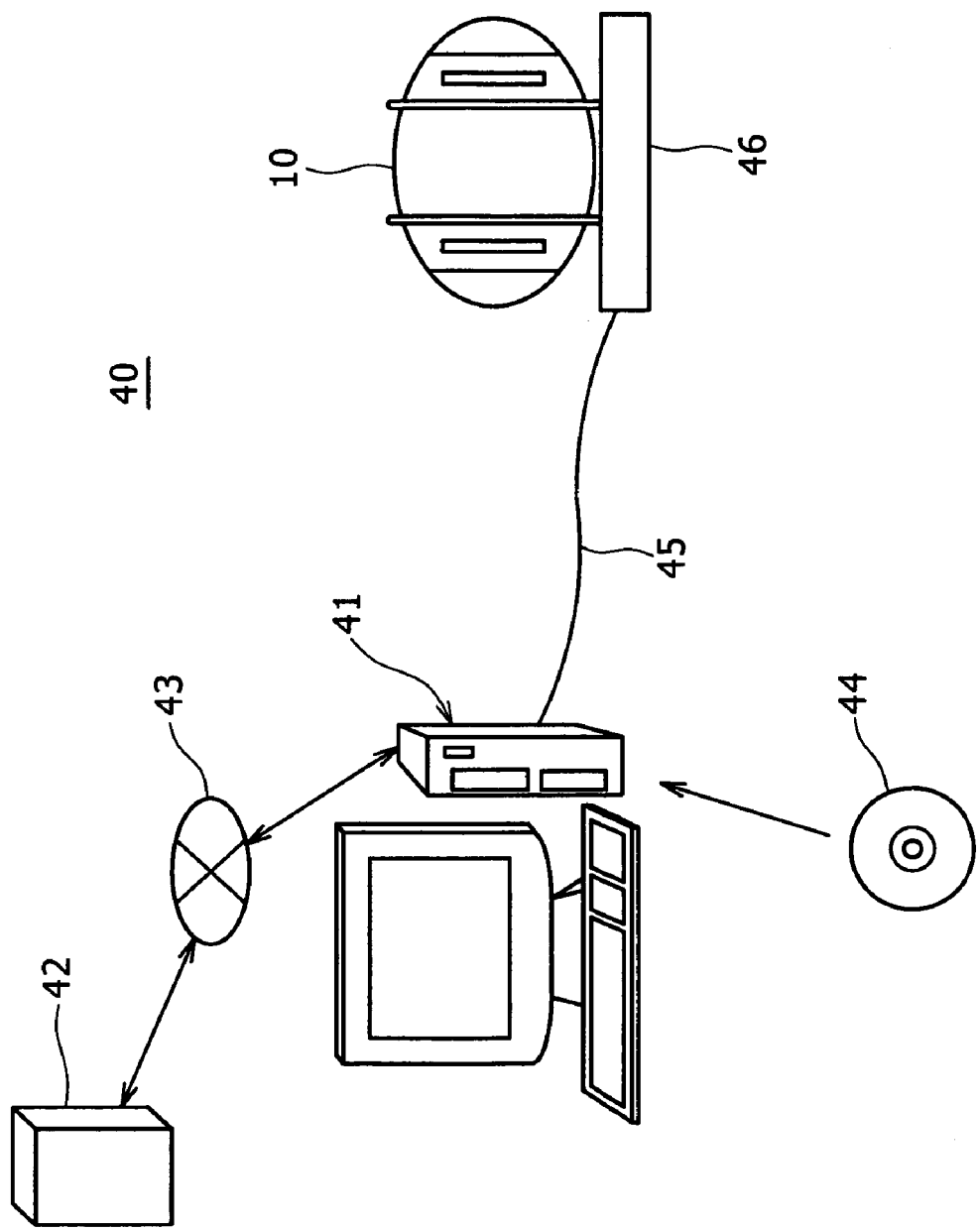
FIG. 9 is a schematic view showing a music data transfer system.

A music data transfer system 40 for transferring music data to the music playback robot device 10 will be described below with reference to FIG. 9. As shown in FIG. 9, the music data transfer system 40 has a data transfer device 41 in the form of a personal computer. The data transfer device 41 acquires music data through a network 43 from a music data providing server 42 which provides music data, or acquires music data from a recording medium 44 such as a CD (Compact Disc) which stores recorded music data.

Figure 10:
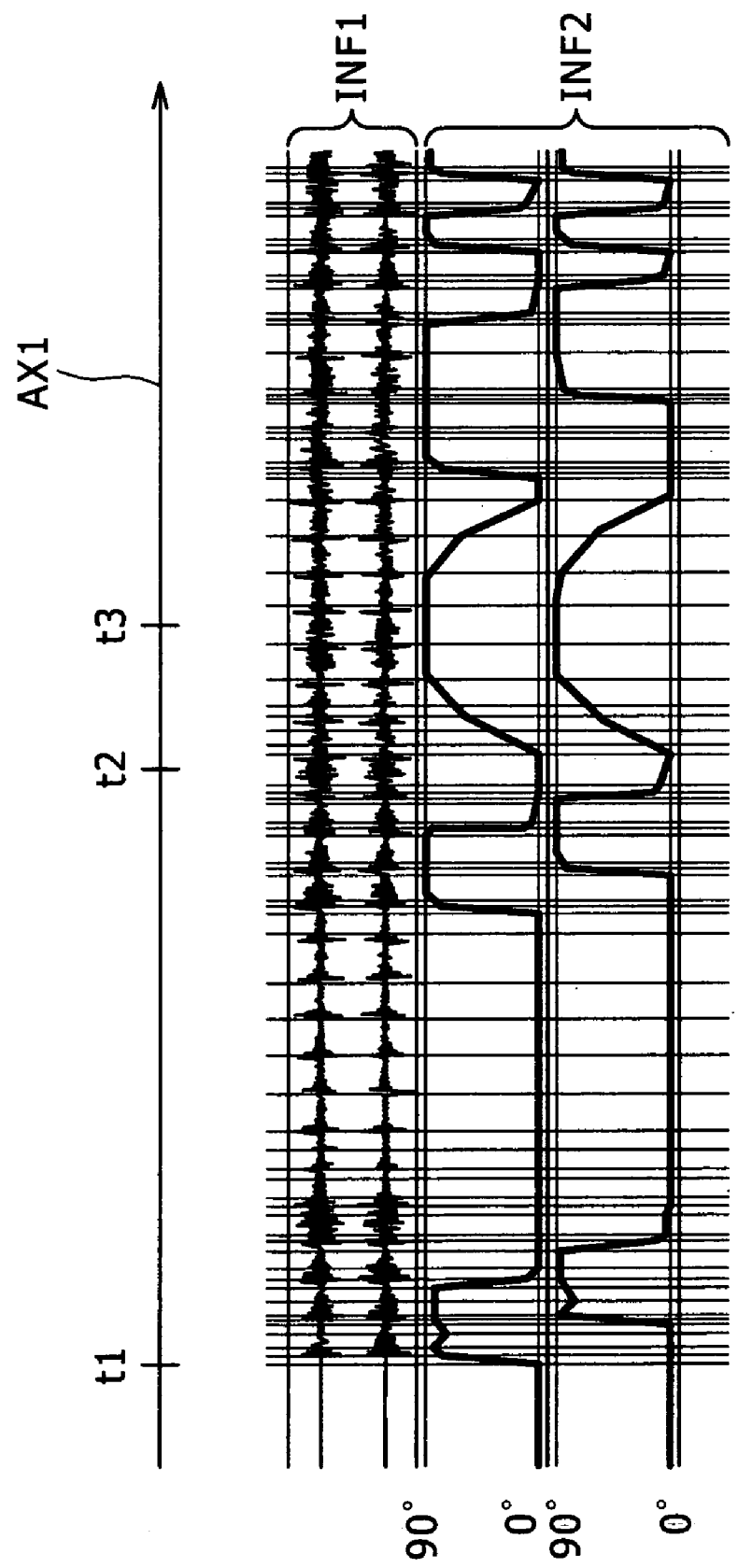
FIG. 10 is a diagram showing analyzed music information and drive information.

The data transfer device 41 performs a frequency analyzing process on music data to be transferred to the music playback robot device 10 for analyzing music elements based on the music data. The data transfer device 41 obtains analyzed music information INF1 representative of analyzed frequencies of the music data along a playback time axis AX1 of the music data to be transferred, as shown in FIG. 10.

Based on the analyzed music information INF1, the data transfer device 41 generates drive information INF2 including, along the playback time axis AX1, a left wheel command value and a right wheel command value for commanding rotating directions, angular displacements, and rotational speeds of the left wheel 12 and the right wheel 13, a left rotor command value and a right rotor command value for commanding rotating directions, rotational speeds, and rotational angles of the left rotor 18 and the right rotor 23, a left openable and closably body command value and a right openable and closably body command value for commanding opening and closing angles and opening and closing speeds of the left openable and closably body 20 and the right openable and closably body 25, and a left light emitter command value and a right light emitter command value for commanding light-emitting states (e.g., colors and brightnesses) of the left light emitter 21 and the right light emitter 26.

The data transfer device 41 thus produces drive information INF2 for driving various components of the ellipsoidal casing 11, i.e., the left wheel 12, the right wheel 13, the left rotor 18, the right rotor 23, the left openable and closably body 20, the right openable and closably body 25, the left light emitter 21, and the right light emitter 26, to the music elements based on the music data. The drive information INF2 shown in FIG. 10 represents the left openable and closably body command value and the right openable and closably body command value for the left openable and closably body 20 and the right openable and closably body 25, respectively.

When the user instructs the data transfer device 41 to transfer data, the data transfer device 41 transfers the music data and the drive information INF2 corresponding to the music data to the music playback robot device 10 successively through a cable 45 and a cradle 46 on which the music playback robot device 10 is placed.

(5) Circuit Arrangement of the Music Playback Robot Device

Figure 11:
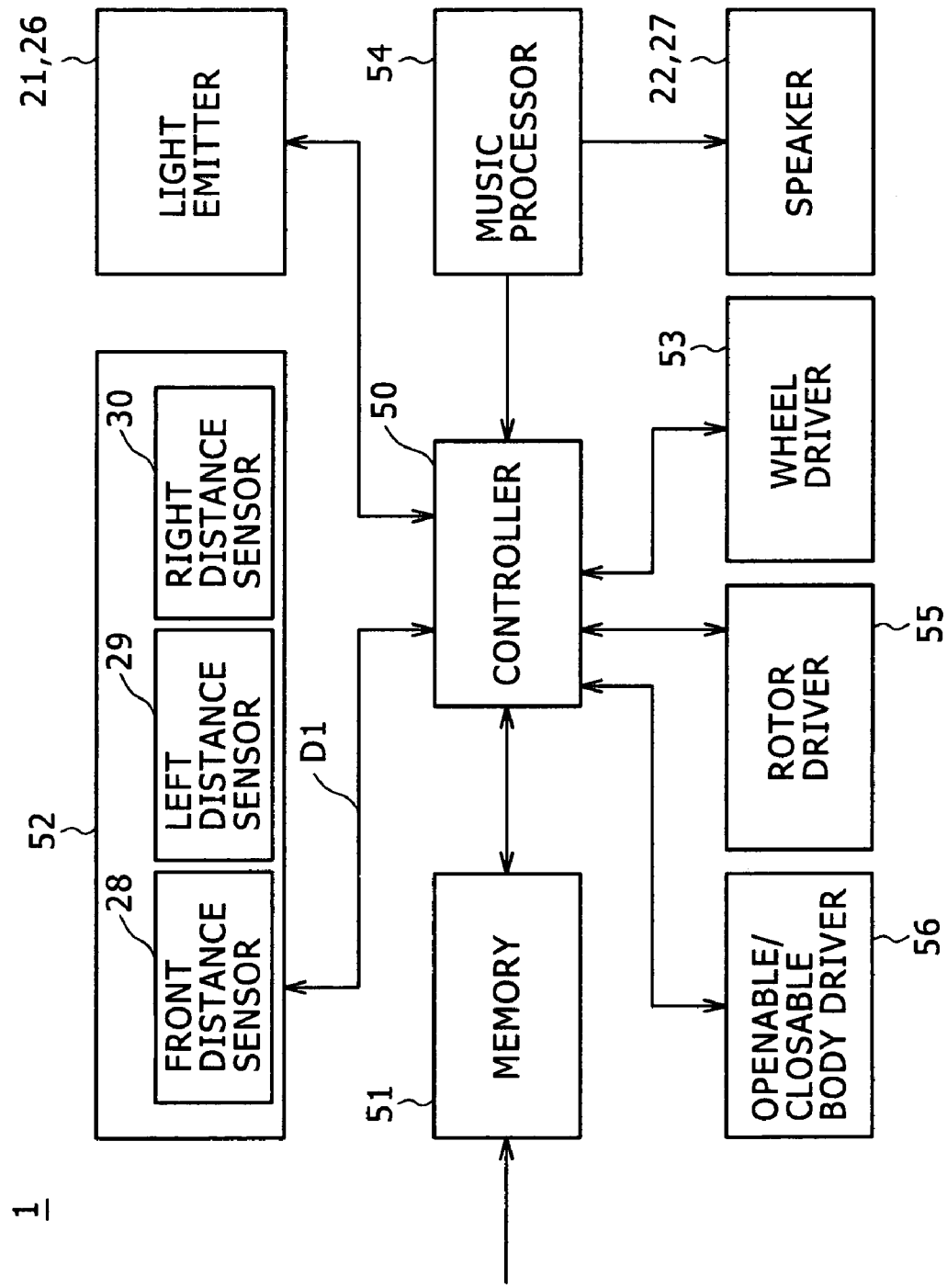
FIG. 11 is a block diagram of a circuit arrangement of the music playback robot device.

Various circuits of the music playback robot device 10 will be described below with reference to FIG. 11. As shown in FIG. 11, the circuits of the music playback robot device 10 are controlled by a controller 50 which is also a circuit of the music playback robot device 10. The controller 50 executes various processing operations according to a program stored in a memory 51. Specifically, the controller 50 writes the music data transferred from the external data transfer device 41 successively through the cable 45 and the cradle 46 and the drive information INF2 corresponding to the music data into the memory 51.

When the controller 50 recognizes removal of the music playback robot device 10 from the cradle 46, the controller 50 acquires distance information DI representing the distance up to the user detected by the front distance sensor 28, the distance up to the user detected by the left distance sensor 29, and the distance up to the user detected by the right distance sensor 30, from a detector 52 which includes the front distance sensor 28, the left distance sensor 29, and the right distance sensor 30.

Figure 12:
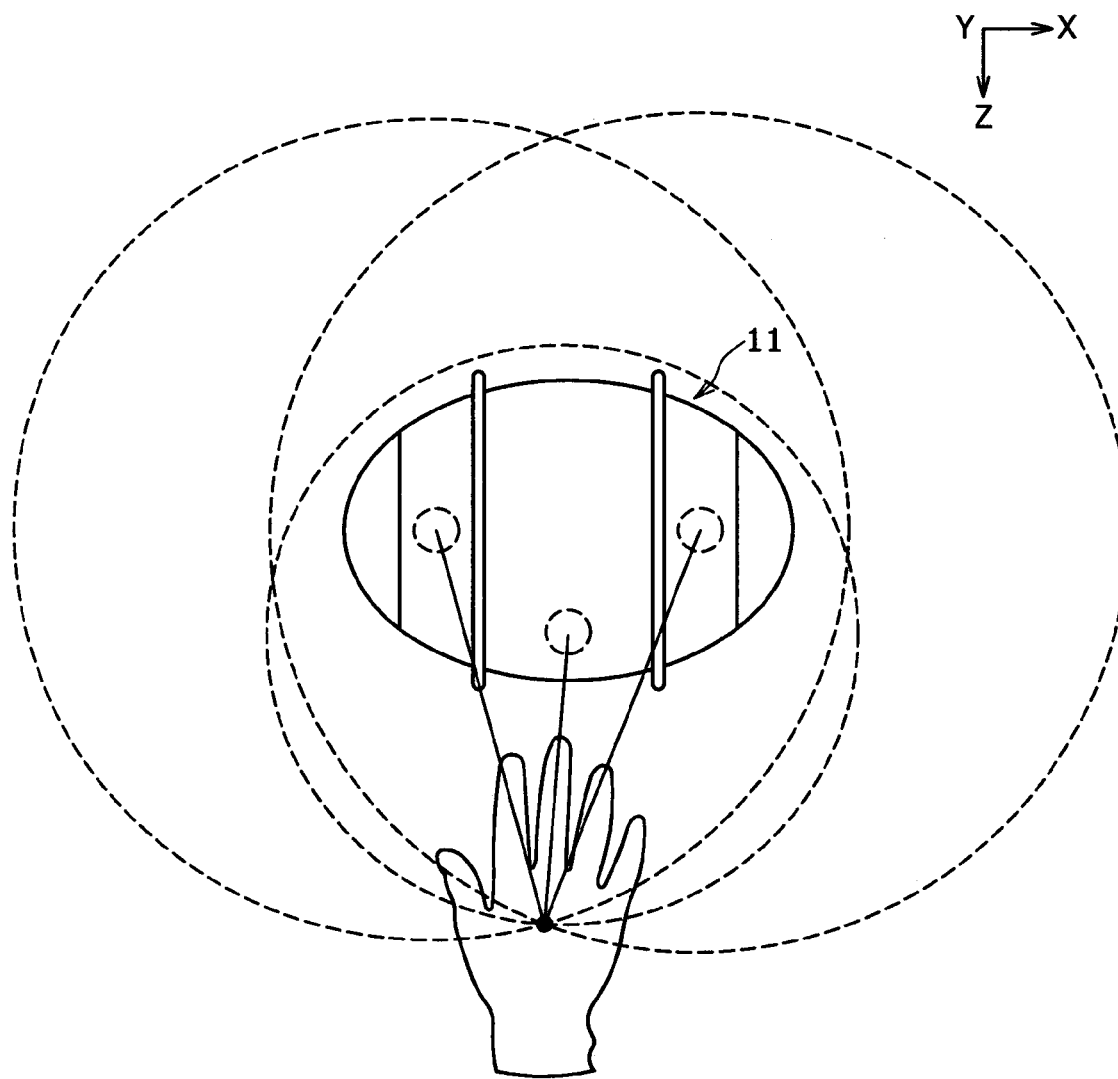
FIG. 12 is a plan view showing the manner in which the position of the user is calculated.

From the distance information DI, the controller 50 recognizes the distance up to the user detected by the front distance sensor 28, the distance up to the user detected by the left distance sensor 29, and the distance up to the user detected by the right distance sensor 30. Based on the recognized distances, the controller 50 calculates the distance from the ellipsoidal casing 11 to the user and the direction of the user as viewed from the front side of the ellipsoidal casing 11. Actually, as shown in FIG. 12, the controller 50 calculates a point of intersection of a sphere having the front distance sensor 28 at its center and a radius represented by the distance up to the user detected by the front distance sensor 28, a sphere having the left distance sensor 29 at its center and a radius represented by the distance up to the user detected by the left distance sensor 29, and a sphere having the left distance sensor 30 at its center and a radius represented by the distance up to the user detected by the left distance sensor 30, thereby specifying the distance from the ellipsoidal casing 11 to the user and the direction of the user as viewed from the front side of the ellipsoidal casing 11.

After having specified the distance up to the user and the direction of the user as viewed from the front side, the controller 50 controls a wheel driver 53 depending on the direction of the user as viewed from the front side to rotate the left wheel 12 and the right wheel 13 in opposite directions, respectively, to change the orientation of the ellipsoidal casing 11 so that the front side thereof faces the user. The controller 50 then controls the wheel driver 53 depending on the distance up to the user to rotate the left wheel 12 and the right wheel 13 in the same direction to move the ellipsoidal casing 11 forward until the distance up to the user will be within a predetermined range.

As described above, the based on the distance information DI acquired from the detector 52, the controller 50 orients the front side of the ellipsoidal casing 11 to the user and moves the ellipsoidal casing 11 toward the user. This mode of operation for moving the ellipsoidal casing 11 toward the user is referred to as a user tracking mode of the controller 50.

When the distance between the user and the ellipsoidal casing 11 falls within the predetermined range, e.g., 30 cm, the controller 50 controls the wheel driver 53 to stop rotating the left wheel 12 and the right wheel 13, and then switches from the user tracking mode to a command entry mode for accepting a command entered by the user. Therefore, when the user is present within the predetermined range from the ellipsoidal casing 11, the controller 50 enters the command entry mode. The predetermined range will hereafter be referred to as a command entry range.

A command entry process of the music playback robot device 10 will be described in detail below. The music playback robot device 10 calculates movement of a hand of the user which is moved in a space around the ellipsoidal casing 11 based on the detected results from the front distance sensor 28, the left distance sensor 29, and the right distance sensor 30, and accepts a command entered depending on the movement of the hand in a non-contact fashion.

Figure 13A:
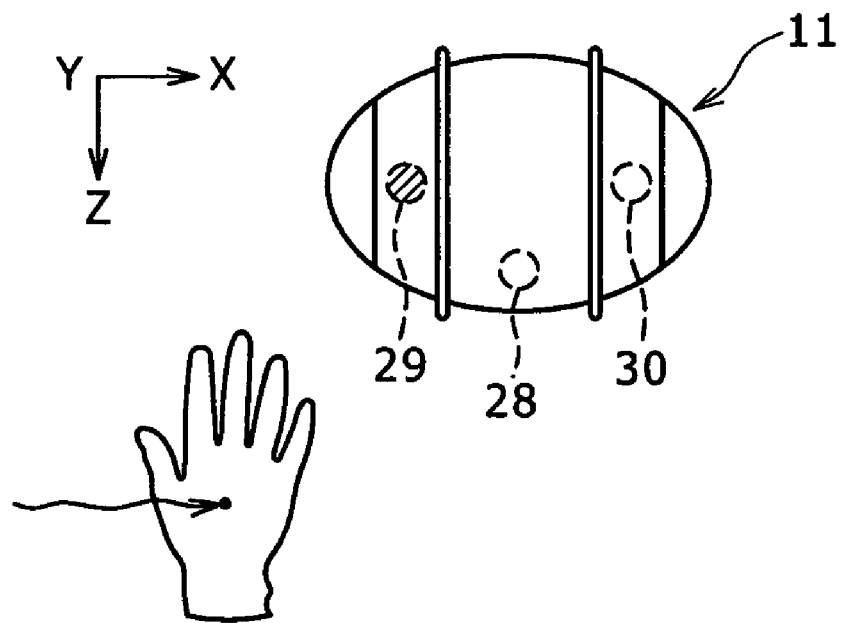
FIGS. 13A and 13B are views showing a process (1) of recognizing movement of the user's hand.
Figure 13B:
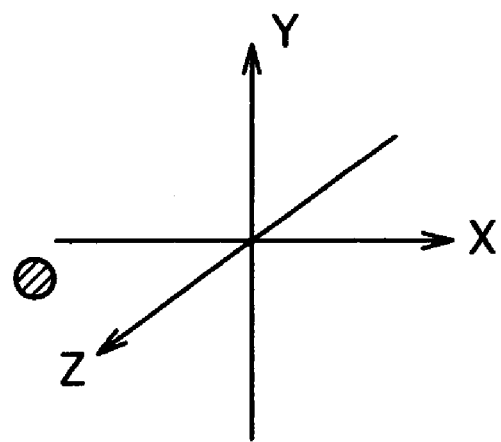

Actually, the controller 50 acquires the distance information DI at given time intervals from the detector 52. As shown in FIG. 13A, when the controller 50 recognizes that, within the command entry range (e.g., 30 cm), the user's hand approaching the ellipsoidal casing 11 from the right as viewed from the front side of the ellipsoidal casing 11, i.e., the user's hand approaching the left casing 15, comes to a position in which the distance up to the user's hand detected by the left distance sensor 29 is equal to or smaller than a predetermined threshold value (e.g., 10 cm), the controller 50 determines that the user's hand is positioned near the left casing 15, and stores, into the memory 51, for example, the positional data at this time of the user's hand as coordinate data in a three-dimensional space represented by a three-dimensional coordinate system having three orthogonal axes, i.e., X-, Y-, Z-axes and an origin located at the central point P1 of the ellipsoidal casing 11, as shown in FIG. 13B.

If the sign of the X-axis coordinate data of the user's hand is positive, then the user's hand is positioned leftward of the origin as viewed from the front side of the ellipsoidal casing 11. If the sign of the X-axis coordinate data of the user's hand is negative, then the user's hand is positioned rightward of the origin as viewed from the front side of the ellipsoidal casing 11. If the sign of the Y-axis coordinate data of the user's hand is positive, then the user's hand is positioned upward of the origin, and if the sign of the Y-axis coordinate data of the user's hand is negative, then the user's hand is positioned downward of the origin. If the sign of the Z-axis coordinate data of the user's hand is positive, then the user's hand is positioned forward of the origin, and if the sign of the Z-axis coordinate data of the user's hand is negative, then the user's hand is positioned rearward of the origin.

Figure 14A:
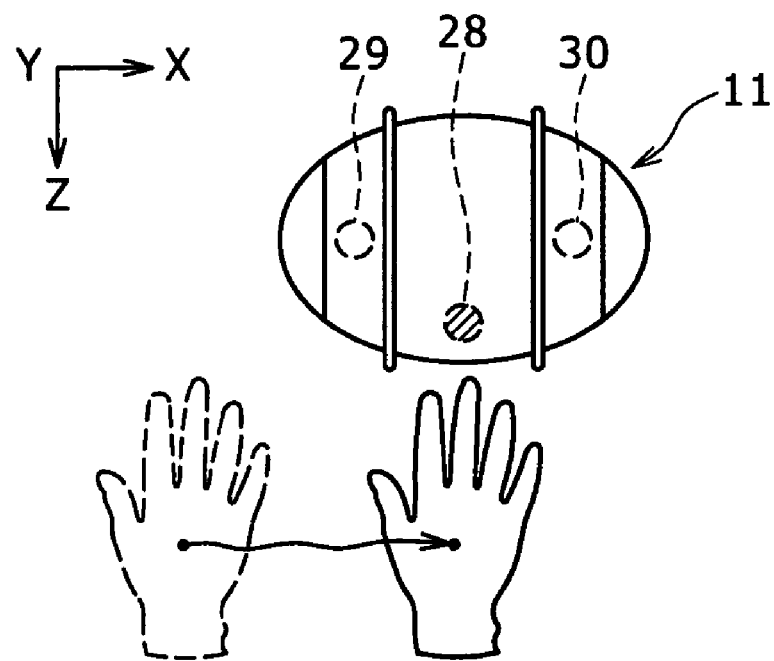
FIGS. 14A and 14B are views showing a process (2) of recognizing movement of the user's hand.
Figure 14B:
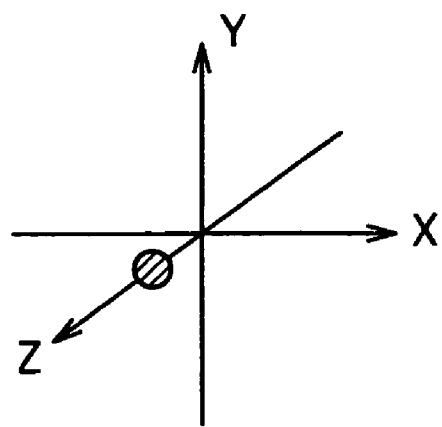

Thereafter, as shown in FIG. 14A, when the controller 50 recognizes that the user's hand moving in a direction from the left casing 15 to the central casing 14 and approaching the central casing 14 comes to a position in which the distance up to the user's hand detected by the front distance sensor 28 is equal to or smaller than a predetermined threshold value (e.g., 10 cm), the controller 50 determines that the user's hand is positioned near the central casing 14, and stores the positional data at this time of the user's hand as coordinate data in the three-dimensional space into the memory 51, as shown in FIG. 14B.

Figure 15A:
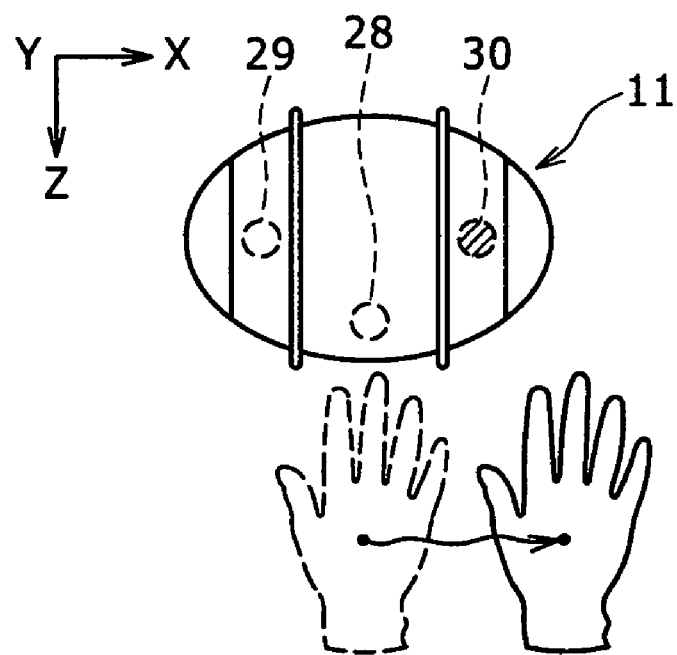
FIGS. 15A and 15B are views showing a process (2) of recognizing movement of the user's hand.
Figure 15B:
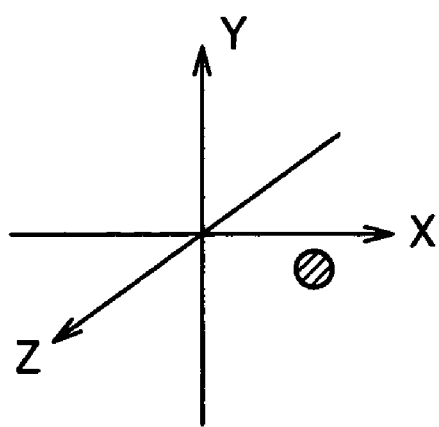

Subsequently, as shown in FIG. 15A, when the controller 50 recognizes that the user's hand moving in a direction from the central casing 14 to the right casing 16 and approaching the right casing 16 comes to a position in which the distance up to the user's hand detected by the right distance sensor 30 is equal to or smaller than a predetermined threshold value (e.g., 10 cm), the controller 50 determines that the user's hand is positioned near the right casing 16, and stores the positional data at this time of the user's hand as coordinate data in the three-dimensional space into the memory 51, as shown in FIG. 15B.

Each time the controller 50 stores coordinate data into the memory 51, the controller 50 calculates a path from the preceding coordinate data to the present coordinate data, and stores path data representing the calculated path into the memory 51. The controller 50 thus calculates a path followed by the user's hand when the user's hand is moved from the right to the left as viewed from the front side of the ellipsoidal casing 11, for example. The controller 50 then compares the calculated path data with patterns of path data stored in advance in the memory 51 in association with commands. If the calculated path data agrees with a pattern of path data which may be associated with a music playback command, for example, then the controller 50 determines that the movement of the user's hand represents a command for music playback, and enters the command for music playback, whereupon the controller 50 enters a music playback mode for playing back music.

In the music playback mode, the controller 50 reads music data stored in the memory 51 (FIG. 11). A music processor 54 processes the music data read by the controller 50, e.g., converts the music data from digital data into analog data, and amplifies the music data, to produce a music signal. Then, speakers 22, 27 output music sounds based on the music signal from the music processor 54.

At this time, the controller 50 drives the various components of the ellipsoidal casing 11, i.e., the left wheel 12, the right wheel 13, the left rotor 18, the right rotor 23, the left openable and closably body 20, the right openable and closably body 25, the left light emitter 21, and the right light emitter 26, in synchronism with the music elements (tempo, musical pitches, etc.) based on the music data being played back.

Specifically, the controller 50 reads the drive information INF2 corresponding to the music data being played back from the memory 51, and controls the wheel driver 53, a rotor driver 55, an openable/closable body driver 56, left light emitter 21, and the right light emitter 26 based on the read drive information INF2.

As a result, the wheel driver 53 rotates the left wheel 12 and the right wheel 13 in synchronism with the music elements based on the music data being played back. The controller 50 can thus move the ellipsoidal casing 11 in synchronism with the music elements of the music that is being output from the speakers 22, 27.

Under the control of the controller 50, the rotor driver 55 rotates the left rotor 18 and the right rotor 23 in synchronism with the music elements based on the music data being played back. The controller 50 can thus rotate the left rotor 18 and the right rotor 23 with respect to the central casing 14 in synchronism with the music elements of the music that is being output from the speakers 22, 27.

Under the control of the controller 50, the openable/closable body driver 56 opens and closes the left openable and closable body 20 and the right openable and closable body 25 in synchronism with the music elements based on the music data being played back. The controller 50 can thus open and close the left openable and closable body 20 and the right openable and closable body 25 in synchronism with the music elements of the music that is being output from the speakers 22, 27.

Under the control of the controller 50, the left light emitter 21, and the right light emitter 26 emit in various emitting states in synchronism with the music elements based on the music data being played back. The controller 50 can thus emit in synchronism with the music elements of the music that is being output from the speakers 22, 27.

Therefore, the music playback robot device 10 can move around as if dancing to the music that is being output from the speakers 22, 27 in the music playback mode.

(6) Operating Sequence

An operating sequence of the music playback robot device 10 from the user tracking mode to the music playback mode will be described below with reference to FIG. 16. The operating sequence is carried out by the controller 50 according to the program installed in the memory 51.

Figure 16:
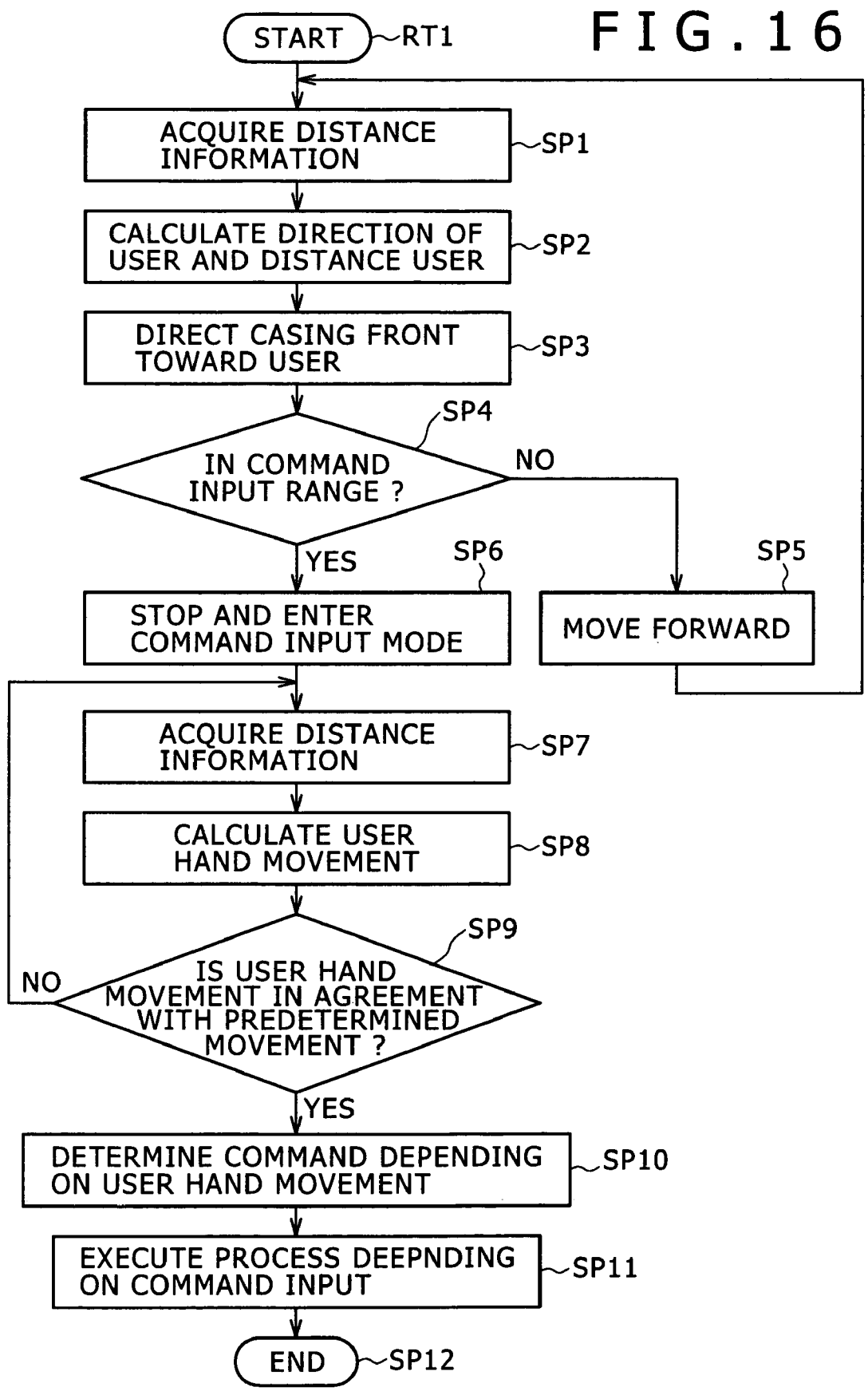
FIG. 16 is a flowchart of a processing sequence of the music playback robot device.

As shown in FIG. 16, when the ellipsoidal casing 11 is removed from the cradle 46, the controller 50 starts an operating sequence RT1, whereupon control goes to step SP1. In step SP1, the controller 50 enters the user tracking mode and acquires distance information DI from the detector 52. Then, control goes to step SP2.

In step SP2, the controller 50 calculates the distance from the ellipsoidal casing 11 to the user and the direction in which the user is present as viewed from the front side of the ellipsoidal casing 11, based on the distance information DI. Then, control goes to step SP3. In step SP3, the controller 50 controls the wheel driver 53 to change the orientation of the ellipsoidal casing 11 so that its front surface faces the user, based on the direction in which the user is present as viewed from the front side of the ellipsoidal casing 11. Then, control goes to step SP4.

In step SP4, the controller determines the position of the user is in the command entry range or not based on the distance up to the user. If the position of the user is not in the command entry range, then control goes from step SP4 (NO in step SP4) to step SP5. In step SP5, the controller 50 controls the wheel driver 53 to move the ellipsoidal casing 11 forward, i.e., in the direction in which the user is present. After elapse of a predetermined time of 0.5 second, for example, control goes back to step SP1 for the controller 50 to acquire the distance information DI.

Until the position of the user is brought into the command entry range, the controller 50 acquires the distance information DI at predetermined time intervals, and controls the wheel driver 53 in a feedback loop based on the distance information DI thereby to move the ellipsoidal casing 11 closely to the user so as to follow the user. Even if the user is moving, therefore, the music playback robot device 10 can recognize the user as it is moving and move closely to the user so as to follow the user.

If the ellipsoidal casing 11 has approached the user until the position of the user is in the command entry range, then control goes from step SP4 (YES in step SP4) to step SP6. In step SP6, the controller 50 controls the wheel driver 53 to stop rotating the left wheel 12 and the right wheel 13, and then switches from the user tracking mode to the command entry mode. Then, control goes to step SP7. If the position of the user is initially in the command entry range, then the controller 50 only changes the orientation of the ellipsoidal casing 11, but not moves the ellipsoidal casing 11. Thereafter, control goes from step SP4 (YES in step SP4) to step SP6 and then to step SP7.

In step SP7, the controller 50 acquires again the distance information DI from the detector 52. Then, control goes to step SP8. In step SP8, the controller 50 calculates a path of movement of the user, i.e., the user's hand, based on the distance information DI, thereby obtaining calculated path data. Then, control goes to step SP9. In step SP9, the controller 50 determines whether the calculated path data is in agreement with any of the patterns of path data stored in advance in the memory 51 in association with commands or not.

If the calculated path data is not in agreement with any of the stored patterns of path data (NO in step SP9), then control goes back to step SP7 for the controller 50 to acquire again the distance information DI. If the calculated path data is in agreement with one of the stored patterns of path data (YES in step SP9), then the controller 50 recognizes that the movement of the user's hand represents a command for music playback, for example. Control then goes to step SP10.

In step SP10, the controller 50 determines that the command corresponding to the movement of the user's hand is a command for music playback, for example. Then, control goes to step SP11. In step SP11, the controller 50 switches from the command entry mode to the music playback mode, and plays back the music data based on the music playback command and drives various components to the music data being played back. Thereafter, control goes to step SP12 in which the operating sequence RT1 is put to an end.

According to the operating sequence RT1, as described above, the controller 50 switches from the user tracking mode to the command entry mode to the music playback mode, and operates the various components and circuits of the music playback robot device 10.

(7) Operation and Advantages

The controller 50 acquires, from the detector 52, distance information DI representative of the distances up to the user which are detected respectively by the front distance sensor 28 disposed in the central casing 14 at the upper front position therein, the left distance sensor 29 disposed in the left casing 15 at the upper position therein, and the right distance sensor 30 disposed in the right casing 16 at the upper position therein.

In the present embodiment, each of the front distance sensor 28, the left distance sensor 29, and the right distance sensor 30 includes a quasi-electrostatic field sensor. As shown in FIG. 5, since the quasi-electrostatic field sensor is a non-directional distance sensor, the distance up to the user which is present in the space around the distance sensor can be detected no matter which direction the user is in as viewed from the distanced sensor. Inasmuch as the front distance sensor 28, the left distance sensor 29, and the right distance sensor 30, each including a nondirectional distance sensor, are located in different positions in the ellipsoidal casing 11, it is possible to specify the position of the user, i.e., the distance up to the user and the direction in which the user is present, from the point of intersection of three spheres which represents the distances up to the user that are detected respectively by the front distance sensor 28, the left distance sensor 29, and the right distance sensor 30.

Therefore, when the controller 50 calculates the distance from the ellipsoidal casing 11 up to the user and the direction of the user as viewed from the front side of the ellipsoidal casing 11, based on the distance information DI acquired from the detector 52, the controller 50 can recognize the distance from the ellipsoidal casing 11 up to the user, and also the direction of the user as viewed from the front side of the ellipsoidal casing 11.

The quasi-electrostatic field sensor operates based on the properties of a quasi-electrostatic field that a potential change caused by an object differs depending on the specific inductive capacity of the object. Therefore, based on the potential change, a human being, i.e., the user, which is present among objects around the distance sensor, can be specified. The quasi-electrostatic field sensor according to an embodiment of the present invention is thus effective to prevent objects other than a human being from being detected in error and to detect the distance up to a human being reliably.

Depending on the recognized direction of the user, the controller 50 controls the wheel driver 53 to change the orientation of the ellipsoidal casing 11 so that the front side thereof faces the user. Therefore, the music playback robot device 10 can be used by the user in an orientation which is supposed to be kept in use, i.e., the orientation in which the front surface of the ellipsoidal casing 11 faces the user, without the need for the user to move to the front side of the ellipsoidal casing 11 or to change the orientation of the ellipsoidal casing 11.

After having directed the front surface of the ellipsoidal casing 11 toward the user, the controller 50 controls the wheel driver 53 depending on the recognized distance up to the user to move the ellipsoidal casing 11 toward the user until the position of the user falls in the command entry range. When the position of the user is in the command entry range, the controller 50 stops moving the ellipsoidal casing 11 and waits for a command to be entered by the user. Therefore, the user does not have to move toward the music playback robot device 10 for entering a command, but the music playback robot device 10 automatically moves into the command entry range for the user to enter a command.

While waiting for a command to be entered by the user, the controller 50 acquires the distance information DI at given time intervals from the detector 52, and calculates a path of the user's hand moved around the ellipsoidal casing 11 based on the successively acquired distance information DI. Then, the controller 50 compares the calculated path data with patterns of path data stored in advance in the memory 51 in association with commands. If the calculated path data agrees with a pattern of path data which may be associated with a music playback command, for example, then the controller 50 determines that the movement of the user's hand represents a command for music playback, and enters the command for music playback. The music playback robot device 10 is thus capable of entering a plurality of commands depending on the movement of the user's hand in a non-contact fashion simply by presetting as many patterns of path data as the number of commands, without the need for contact-type input elements such as operation buttons on the ellipsoidal casing 11.

As the front surface of the ellipsoidal casing 11 is oriented at all times toward the user, the orientation of the ellipsoidal casing 11 as viewed from the user remains the same at all times. As a result, the movement of the user's hand as viewed from the user and the entry of a command are associated with each other identically at all times, allowing the user to enter a command with ease. Therefore, the music playback robot device 10 allows the user to enter a command in an orientation which is supposed to be held when a command is entered.

With the above arrangement, the music playback robot device 10 calculates a direction in which the user is present as an object, based on the distances up to the user which are detected respectively by the front distance sensor 28, the left distance sensor 29, and the right distance sensor 30 which are located in different positions in the ellipsoidal casing 11, and changes the orientation of the ellipsoidal casing 11 into alignment with the calculated direction. Therefore, the music playback robot device 10 can be used by the user in the orientation depending on the direction in which the user is present, i.e., in the direction in which the playback robot device 10 is supposed to be used, without the need for the user to move with respect to the playback robot device 10 or to change the orientation of the ellipsoidal casing 11 with respect to the user. Consequently, the music playback robot device 10 as the electronic device according to the present invention is much easier to use than heretofore, and a method of controlling the music playback robot device 10 according to the present invention allows the music playback robot device 10 to be used much easier than heretofore.

(8) Other Embodiments

Figure 17:
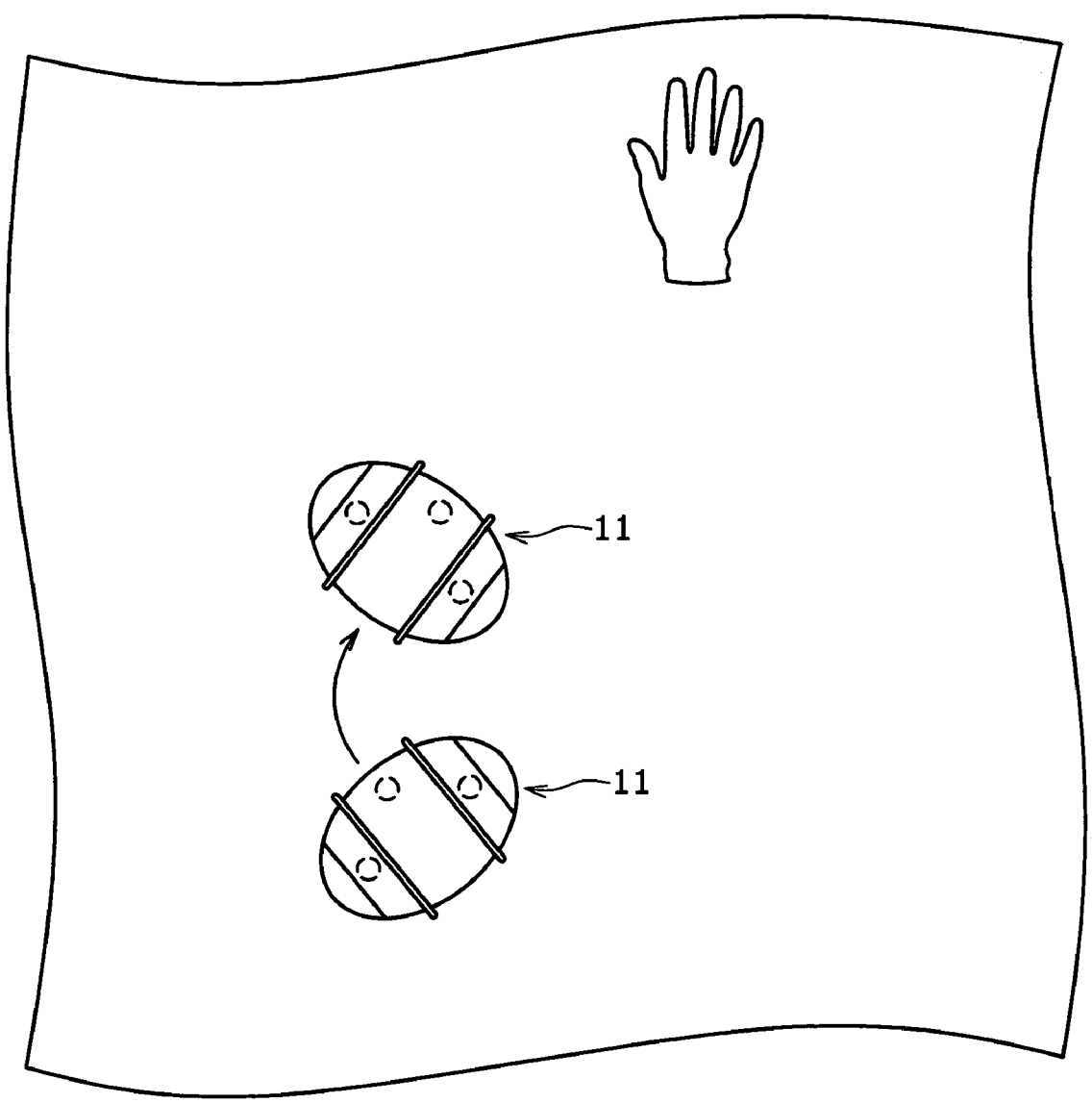
FIG. 17 is a plan view showing the manner in which an ellipsoidal casing changes its orientation according to another embodiment of the present invention.

According to the above embodiment, when the music playback robot device 10 recognizes the direction of the user as viewed from the front side of the ellipsoidal casing 11, the music playback robot device 10 changes the orientation of the ellipsoidal casing 11 on site to direct the front surface of the ellipsoidal casing 11 toward the user and thereafter moves the ellipsoidal casing 11 toward the user until the distance up to the user will be in the command entry range. However, as shown in FIG. 17, if the user is present obliquely forward to the right as viewed from the front side of the ellipsoidal casing 11, the orientation of the ellipsoidal casing 11 may not be changed on site, but the ellipsoidal casing 11 may be turned while moving obliquely forward to the right, so that front surface of the ellipsoidal casing 11 will face the user and the ellipsoidal casing 11 will approaches the user. According to the embodiment shown in FIG. 17, even a music playback robot device which has a four-wheel drive mechanism and which cannot be turned on site offers the same advantages as the above two-wheeled music playback robot device 10. Stated otherwise, the music playback robot device 10 may have a drive mechanism other than the two-wheel drive mechanism. The drive mechanism includes, for example, the left wheel 12, the right wheel 13, and the wheel driver 53 of the music playback robot device 10.

According to the above embodiment, in the music playback mode, music sounds are output from the speakers 22, 27 as a music output unit, and the left wheel 12, the right wheel 13, the left rotor 18, the right rotor 23, the left openable and closably body 20, the right openable and closably body 25, the left light emitter 21, and the right light emitter 26 are driven to move around to the music being played back. However, in the music playback mode, the left wheel 12 and the right wheel 13 may be stopped to keep the music playback robot device 10 at rest, and the left rotor 18 and the right rotor 23 may be rotated and the left openable and closably body 20 and the right openable and closably body 25 may be opened and closed for bringing the front surfaces of the vibrating plates of the speakers 22, 27 into facing relationship to the user which is positioned in front of the ellipsoidal casing 11. According to this modification, since music sounds are output from the speakers 22, 27 while the front surfaces of the vibrating plates of the speakers 22, 27 are facing the user, the user is allowed to listen to the music being played back at all times in a good listening position without the need for the user to move or to change the orientation of the ellipsoidal casing 11.

In the above embodiment, the present invention is applied to the self-propelled music playback robot device 10. However, the present invention is also applicable to various electronic devices including a self-propelled image playback robot device having a display unit as an image output unit including a liquid crystal display, on the front surface of the ellipsoidal casing 11; a stationary display device with a swiveling display surface; a stationary speaker device with a swiveling speaker front surface; etc. If the present invention is applied to a stationary display device with a swiveling display surface, then though the stationary display device is unable to move toward the user, the stationary display device is capable of recognizing the direction of the user and turning the display surface so as to faced the user, so that the user can see displayed images at all times from a good viewing position.

In the above embodiment, the present invention is applied to the music playback robot device 10 which is capable of entering commands in a non-contact fashion. However, the present invention is applicable to a remote controller which is capable of entering commands in a non-contact fashion. According to this modification, the music playback robot device 10 has a communication unit controlled by the controller 50 for communicating with an external device. When the position of the user is brought into the command entry range, the controller 50 stops moving the ellipsoidal casing 11, and sends a signal to turning on the power supply of the external device through the communication unit to the external device. The controller 50 then waits for a command to be entered by the user for the external device. The controller 50 sends a signal depending on the entered command through the communication unit to the external device. In this manner, the music playback robot device 10 functions as a remote controller. The remote controller can automatically move into the command entry range to allow the user to enter a command in a non-contact fashion without the need for the user to approach the remote controller for entering a command or to lift the remote controller in a predetermined orientation. The communication unit may employ an infrared communication process such as IrDA (registered trademark) or a wireless communication process such as Bluetooth (registered trademark) or HomeRF (registered trademark).

According to the above embodiment, when the user's hand is moved in the direction from the left casing 15 to the right casing 16 of the ellipsoidal casing 11, i.e., from the left to the right as viewed from the user, in the space near the ellipsoidal casing 11, a music playback command, for example, as a command corresponding to the movement of the user's hand is entered into the music playback robot device 10. However, a pattern of path data representing the movement of the user's hand from the right to the left, a pattern of path data representing the movement of the user's hand from a front position to a rear position, a pattern of path data representing the movement of the user's hand from a rear position to a front position, a pattern of path data representing the movement of the user's hand from a lower position to an upper position, etc. may be stored in advance in the memory 51, and these patterns of path data may be associated respectively with a fast-forward command, a rewind command, a volume up command, and a volume down command for the music data. Any of these commands can be entered when the user's hand makes a corresponding movement.

According to the above embodiment, the front distance sensor 28 is disposed in the central casing 14 of the ellipsoidal casing 11 at the upper front position therein, the left distance sensor 29 is disposed in the left casing 15 of the ellipsoidal casing 11 at the upper position therein, and the right distance sensor 30 of the ellipsoidal casing 11 is disposed in the right casing 16 at the upper position therein. However, distance sensors may be disposed respectively in the central casing 14 at a central rear position therein, in the left casing 15 at a central position therein, and in the right casing 16 at a central position therein. According to the present invention, the distance sensors may be positioned in other positions than the illustrated positions insofar as the position of the user can be calculated from the distances detected by the distance sensors.

According to the above embodiment, each of the front distance sensor 28, the left distance sensor 29, and the right distance sensor 30 includes a quasi-electrostatic field sensor. However, a distance sensor such as a PSD (Position Sensing Device) or an ultrasonic sensor may be used instead of a quasi-electrostatic field sensor, or various these distance sensors may be used in combination. In addition, a distance sensor such as an infrared sensor, for example, for detecting the distance up to the user which is present in a predetermined direction may be employed. In such a case, a plurality of (e.g., several tens to several hundreds) distance sensors for detecting the distances up to users which are present in different directions may be mounted on substantially the entire surface of the ellipsoidal casing 11 for specifying the positions of the users which are present in the space around the ellipsoidal casing 11.

In the above embodiment, the three distance sensors are disposed at different positions in the ellipsoidal casing 11. However, more than three distance sensors may be employed. Actually, an increased number of distance sensors allow the movement of the user's hand for entering a command to be recognized with a greater resolution, so that smaller patterns of the movement of the user's hand may be associated with commands.

In the above embodiment, the substantially ellipsoidal casing 11 is employed. However, any of casings having various other shapes may be used.

In the above embodiment, the music playback robot device 10 is made up of the controller 50, the memory 51, the detector 52, the wheel driver 53, the music processor 54, the rotor driver 55, the openable/closable body driver 56, the speakers 22, 27, and the light emitters 21, 26. However, the music playback robot device 10 may have any of other configurations insofar as they have the same functions as described above.

The electronic device 1 shown in FIGS. 1 and 2 corresponds to the music playback robot device 10 shown in FIGS. 6, 7, and 11. The main body 2 (see FIG. 1) of the electronic device 1 corresponds to the ellipsoidal casing 11 (see FIG. 6) of the music playback robot device 10. The distance sensors S1, S2, S3 (see FIG. 1) correspond to the front distance sensor 28, the left distance sensor 29, and the right distance sensor 30 (see FIG. 6), respectively. The drive mechanism 3 (see FIG. 2) corresponds to the left wheel 12, the right wheel 13 (see FIG. 6), and the wheel driver 53 (see FIG. 11). The detector 4 (see FIG. 2) corresponds to the detector 52 (see FIG. 11). The calculator 5 and the controller 6 (see FIG. 2) correspond to the controller 50 (see FIG. 11).

In the above embodiment, the controller 50 software-implements the above operating sequence according to the program installed in the music playback robot device 10. However, the music playback robot device 10 may have a dedicated circuit for performing the operating sequence, and the operating sequence may be hardware-implemented by the dedicated circuit. The program for performing the operating sequence may be recorded in a recording medium such as a CD or the like.

Although certain preferred embodiments of the present invention have been shown and described in detail, it should be understood that various changes and modifications may be made therein without departing from the scope of the appended claims.

The invention claimed is:

1. An electronic device, comprising:
   a main body;
   a drive mechanism configured to move the main body;
   a detector having three quasi-electrostatic field sensors, each sensor mounted in the main body and for detecting a respective distance between the respective sensor and an object which is present in a space around the main body;
   a calculator configured to calculate a distance and a direction of the object relative to the main body based on three detected distances from the three quasi-electrostatic field sensors; and
   a controller configured to control the drive mechanism to change an orientation of the main body toward the object dependent on the calculated direction,
   wherein during operation each of said three quasi-electrostatic field sensors generates a number of quasi-electrostatic fields respectively corresponding to a number of frequencies which respectively correspond to a number of distances from the respective sensor, detects a variation or variations in the number of quasi-electrostatic fields due to the object, identifies the respective frequency corresponding to the quasi-electrostatic field whose variation exceeds a predetermined value, and obtains the respective distance corresponding to the identified frequency as the distance between the respective sensor and the object, such that the three quasi-electrostatic sensors detect the three distances between the three sensors and the object, and wherein during operation the calculator calculates a point of intersection of three geometric shapes in which each shape has one of the three distances as a radius thereof and is centered on the respective sensor, and specifies the distance and the direction of the object relative to the main body by use of the point of intersection.

2. The electronic device according to claim 1, wherein the controller is configured to control the drive mechanism to change the orientation of the main body and to move the main body toward the object dependent on the calculated direction.

3. The electronic device according to claim 2, further comprising:

a communication unit configured to communicate with an external device, wherein the controller is configured to control the drive mechanism to change the orientation of the main body and to move the main body toward the object, and to control the communication unit to communicate with the external device, dependent on the calculated direction.

4. The electronic device according to claim 2, wherein the controller is configured to stop controlling the drive mechanism if the calculated distance to the object is in a predetermined range.

5. The electronic device according to claim 1, further comprising:

a sound output unit mounted in the main body, the sound output unit having a sound radiating surface, wherein the controller is configured to control the drive mechanism to change the orientation of the main body to bring the sound radiating surface of the sound output unit into facing relationship with the object depending on the calculated direction.

6. The electronic device according to claim 1, further comprising:

an image output unit mounted in the main body, the image output unit having a display surface, wherein the controller is configured to control the drive mechanism to change the orientation of the main body to bring the display surface of the image output unit into facing relationship with the object depending on the calculated direction.

7. A method of controlling an electronic device, said method comprising:

detecting distances to an object using three quasi-electrostatic field sensors, each sensor mounted in a main body, the object being present in a space around the main body;

calculating a distance and a direction of the object relative to the main body based on the detected distances; and controlling a drive mechanism to change an orientation of the main body toward the object dependent on the calculated direction, wherein during operation each of said three quasi-electrostatic field sensors generates a number of quasi-electrostatic fields respectively corresponding to a number of frequencies which respectively correspond to a number of distances from the respective sensor, detects a variation or variations in the number of quasi-electrostatic fields due to the object, identifies the respective frequency corresponding to the quasi-electrostatic field whose variation exceeds a predetermined value, and obtains the respective distance corresponding to the identified frequency as the distance between the respective sensor and the object, such that the three quasi-electrostatic sensors detect the three distances between the three sensors and the object, and wherein during operation the calculating includes calculating a point of intersection of three geometric shapes in which each shape has one of the three distances as a radius thereof and is centered on the respective sensor, and specifying the distance and the direction of the object relative to the main body by use of the point of intersection.

* * * * *